Figure 1:
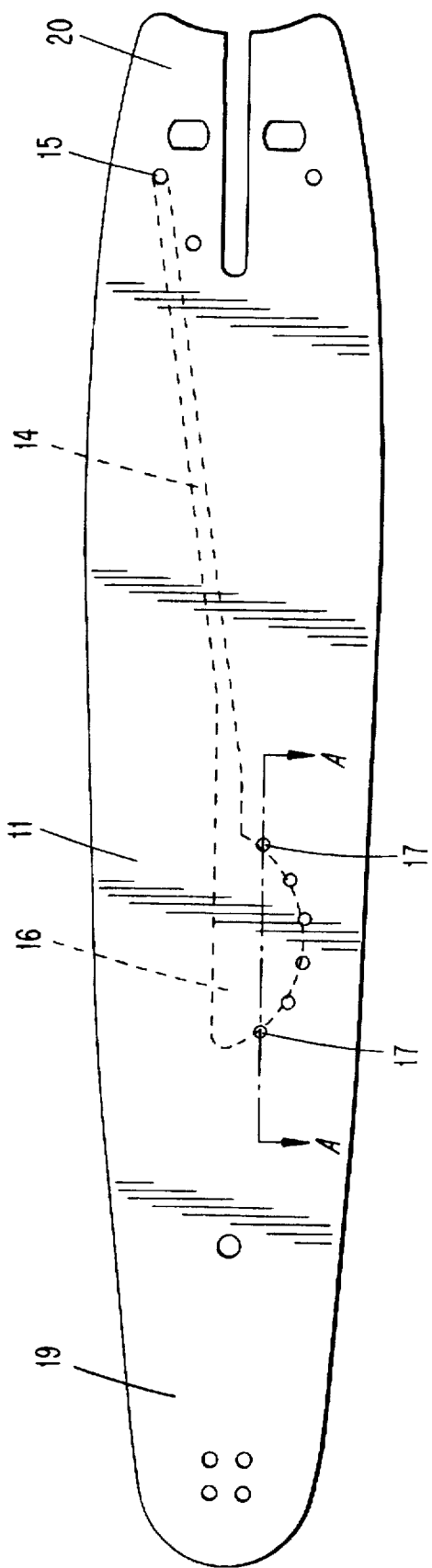
Figure 2:
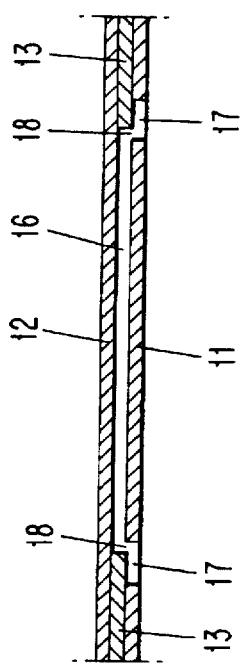

United States Patent [19]
Leini

[11] Patent Number: 5,778,537
[45] Date of Patent: Jul. 14, 1998

[54] CHAIN SAW GUIDE BAR WITH LIQUID SPRAY DEVICE

[75] Inventor: Arvo Leini, Edsbyn, Sweden

[73] Assignee: Sandvik AB, Sandviken, Sweden

[21] Appl. No.: 765,946

[22] PCT Filed: Jun. 9, 1995

[86] PCT No.: PCT/SE95/00692

§ 371 Date: Feb. 27, 1997

§ 102(e) Date: Feb. 27, 1997

[87] PCT Pub. No.: WO96/01725

PCT Pub. Date: Jan. 25, 1996

[30] Foreign Application Priority Data

Jul. 11, 1994 [SE] Sweden ............... 9402426-2

[51] Int. Cl.[6] .................... B23D 59/04
[52] U.S. Cl. ............ 30/123.4; 30/383; 47/1.5; 47/8; 144/34.1; 144/380
[58] Field of Search ........... 144/34.1, 363, 144/364, 380; 125/21; 47/1.5, 8; 30/123.3, 123.4, 123.7, 383, 384, 387

[56] References Cited

U.S. PATENT DOCUMENTS

| | | |
|---|---|---|
| 4,819,332 | 4/1989 | Sugihara et al. ............ 30/123.4 |
| 5,050,303 | 9/1991 | Sinclair et al. . |
| 5,143,131 | 9/1992 | Seigneur et al. . |
| 5,426,854 | 6/1995 | Leini et al. . |

FOREIGN PATENT DOCUMENTS

| | | |
|---|---|---|
| 7604765-3 | 10/1976 | Sweden . |
| 469 974 | 10/1993 | Sweden . |

*Primary Examiner*—W. Donald Bray
*Attorney, Agent, or Firm*—Burns, Doane, Swecker & Mathis, L.L.P.

[57] ABSTRACT

Chain saw guide bar and method of using a guide bar for spraying liquid on a sawn surface through a plurality of orifices formed in a guide bar side plate. The liquid is introduced into an inlet portion of a passage formed in a center plate of the guide bar and is conducted forwardly to the orifices. The liquid is sprayed from the orifices at equal pressures, and in spray directions having a component oriented parallel to a centerline of the guide bar. Thus, by adjusting the velocity of the sprayed liquid, the length dimension of the area sprayed can be adjusted.

9 Claims, 1 Drawing Sheet

CHAIN SAW GUIDE BAR WITH LIQUID SPRAY DEVICE

BACKGROUND

It is previously known that chain saw guide bars can be provided with channels and orifices to spray the sawn surface with liquid, such as paint for colour coding or fungicide as described in patent SE 7611822-3, or both. Such guide bars are commonly used on vehicle-born chain saws.

For colour coding it is important to get distinct markings, and each liquid channel then has generally just one orifice. For spraying fungicide, it is important to cover a major part of the sawn surface, but at the same time not to spray outside that surface, which would constitute excessive waste of liquid and an environmental hazard.

In U.S. Pat. No. 5,143,131 was described a guide bar design where the liquid channel has a multitude of orifices, all of which need not be open simultaneously. The choice of which orifices are to be open is regulated with slideable metal strips with orifices forming a different pattern from the orifices in the sideplate of the guide bar. The strips are moved with an external device, such as a hydraulic actuator on the underside of the guide bar, until the desired number of orifices coincide between the strip and the sideplate. Such a device is vulnerable, however, due to the slideable strips and the unprotected location of the hydraulic actuator. It is also difficult to have a reliable indication at the operator's cab of how large a surface is being sprayed.

The present invention concerns a chain saw guide bar for fungicide spraying, where the extent of the sprayed area can be varied in relation to the size of the sawn surface, without small movable parts and without actuators at the guide bar, and where it is simple to indicate for the operator how large an area is sprayed.

DESCRIPTION OF THE INVENTION

A guide bar according to the invention is provided with orifices which give the liquid a velocity component along the plane of the guide bar, not only vertical to the plane. Such orifices are described in the patent SE 9300180-8, where they were utilized to make liquid spray from orifices near the bar centerline hit the cut surface close to the edge of the bar, to allow return of the bar as soon as the saw chain has fully penetrated the tree trunk, with a smallar angular movement than otherwise. According to that patent the liquid is given a velocity component across the bar from the centerline towards the edge.

In a guide bar according to invention, a plurality of orifices are located to give the liquid a velocity component parallel to the bar centerline. The size of this velocity component and thus the width of the sprayed area measured along the bar depends on the liquid pressure in the channels of the bar before the orifices.

The orifices are located adjacent to a pressure equalizing chamber in the guide bar, to make the spray velocity independent of the liquid flow within the channels. By measuring the liquid pressure at a pump or pressure vessel in the operator's cab, the operator can judge the width of the sprayed area. The spraying occurs during angular motion of the bar while sawing, and the pressure may be automatically controlled in relation to the position of the gripping arms of the machine holding the tree, this position indicating the diameter of the tree.

BRIEF DESCRIPTION OF THE DRAWINGS

A guide bar with spray orifices in one sideplate according to the invention is shown in FIG. 1 in a view from below, and in FIG. 2 as a cross section through the pressure equalizing chamber. If desired, the bar can be made reversible and symmetrical with two pressure chambers and orifices in both sideplates.

DETAILED DESCRIPTION OF A PREFERRED EMBODIMENT OF THE INVENTION

The guide bar comprises two sideplates (11,12) and one center plate (13) joined by welding, brazing or adhesive. A liquid channel (14) is made as a cut-out in the center plate (13) to convey the liquid from a supply hole (15) near the clamping end (20) of the guide bar to a pressure equalizing chamber (16) with a larger cross section than the channel (14). This makes the velocity of the liquid within the chamber (16) much lower than in the channel (14). The spray velocity from all orifices is then equal, and dependent only on the pressure.

In the sideplate (11) there are orifices (17). The channel (14) and the pressure equalizing chamber (16) together form a liquid-conducting passage leading to the orifices. Only a minor part (18) of the area along the edge of each orifice overlaps the pressure equalizing chamber (16). The orifices are large enough to be blanked in the same operation as the sideplate contour. The pressure equalizing chamber (16) has a convex contour facing the guide bar edge. This orients the overlapping parts of the orifices in such directions, that liquid sprayed from the orifices closest to the guide bar nose (19) has a velocity component towards the nose, and liquid sprayed from the orifices closest to the clamping end (20) has a velocity component towards the clamping end. An equivalent effect can also be achieved by drilling smaller orifices obliquely through through the sideplates, but this is more difficult and liable to clog.

With low liquid pressure the spray will not reach far outside the width of the chamber (16) and the liquid quantity will be limited. With a high liquid pressure the spray will reach a wider area and the liquid consumption will be higher.

The liquids used to protect the sawn surfaces, primarily the remaining stumps, from fungal infection, is either chemicals such as urea, or water suspensions of spores of harmless fungi which are antagonists or competitors to the harmful fungi. Pigments may be added to verify the liquid flow and to mark which surfaces have been treated.

I claim:

1. A guide bar adapted for use in a vehicle-borne chain saw for spraying liquid onto a sawn surface, the guide bar having a longitudinal centerline extending between front and rear ends of the guide bar, the guide bar comprising two side plates and a center plate disposed therebetween, the center plate including a cut-out formed in at least one side thereof, the cut-out defining a passage having inlet and outlet portions, the inlet portion disposed adjacent the rear end of the guide bar for receiving a liquid to be sprayed, at least one of the side plates including spray orifices communicating with the outlet portion of the passage for spraying liquid received therefrom, at least some of the orifices arranged such that a spray direction thereof has a component extending parallel to the centerline of the guide bar.

2. The guide bar according to claim 1 wherein the passage includes a channel extending from the inlet portion, and an enlarged equalizing chamber forming the outlet portion of the passage, the equalizing chamber having a larger cross section than the channel, the orifices communicating directly with the equalizing chamber.

3. The guide bar according to claim 2 wherein the at least one side plate includes an inner surface facing the center plate, said at least some orifices being arranged such that only a portion of their respective cross-sectional areas overlaps the pressure equalizing chamber.

4. The guide bar according to claim 3 wherein said at least some orifices constitute all of the orifices.

5. The guide bar according to claim 4 wherein an edge portion of the pressure equalizing chamber protrudes convexly toward an edge of the guide bar, the orifices communicating with the pressure equalizing chamber along the convex edge portion thereof.

6. The guide bar according to claim 2 wherein another cut-out is formed in another side of the center plate, and such other side plate includes orifices communicating with the other cut-out for spraying liquid.

7. A method of spraying liquid from a vehicle-borne chain saw onto a sawn surface comprising the steps of: introducing the liquid under pressure into an inlet portion of a passage formed in a guide bar of the chain saw, conducting the liquid forwardly to an outlet portion of the passage, spraying the liquid outwardly through orifices formed in at least one side of the guide bar such that the spray direction of the liquid from at least some of the orifices has a component extending substantially parallel to a centerline of the guide bar.

8. The method according to claim 7 wherein said at least some orifices constitute all of the orifices.

9. The method according to claim 7 wherein the liquid is conducted through a channel of the passage to an enlarged pressure equalizing chamber which communicates the channel with all of the orifices.

* * * * *